Nov. 29, 1932.  G. E. THIMMES  1,889,300
ANTISKID TIRE CHAIN
Filed March 26, 1931  2 Sheets-Sheet 1
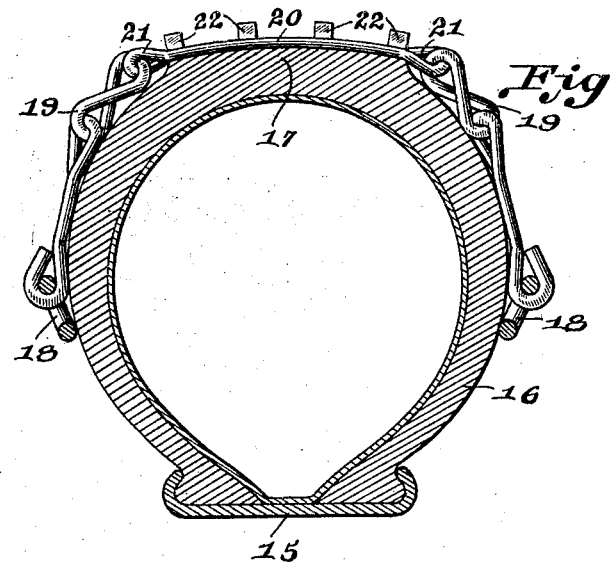
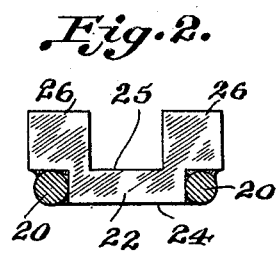
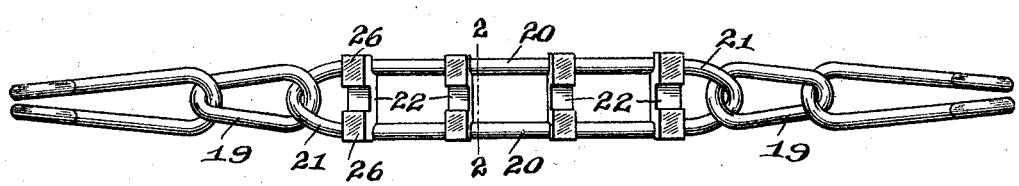
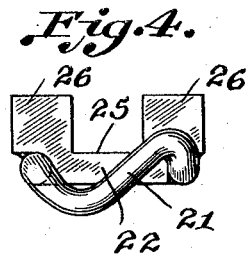
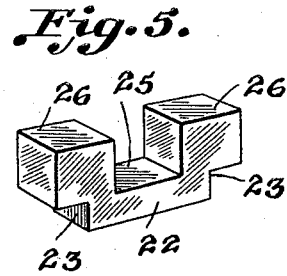
Inventor
George E. Thimmes,
By Mawhinney & Mawhinney,
Attorneys.

Nov. 29, 1932.  G. E. THIMMES  1,889,300
ANTISKID TIRE CHAIN
Filed March 26, 1931   2 Sheets-Sheet 2
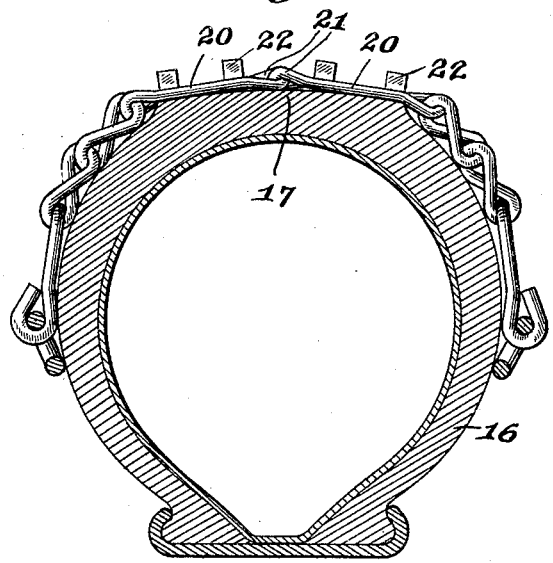
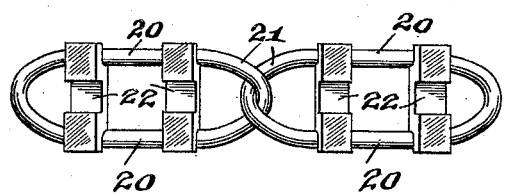
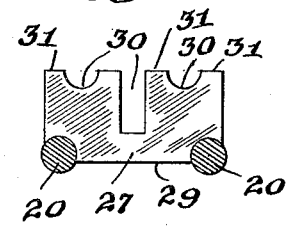 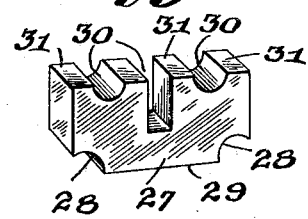
Inventor
George E. Thimmes,
By Mawhinney & Mawhinney,
Attorneys.

Patented Nov. 29, 1932

1,889,300

UNITED STATES PATENT OFFICE

GEORGE E. THIMMES, OF MECHANICSVILLE, IOWA

ANTISKID TIRE CHAIN

Application filed March 26, 1931. Serial No. 525,547.

The present invention relates to anti-skid tire chains and more particularly to an improved cross or tread chain forming a part thereof.

An object of the present invention is to provide a cross chain adapted particularly to the needs of the present day motorist driving over hard and paved roadways and wherein even slight projections from the tire tread produce an unpleasant and detrimental rise and fall of the vehicle in passing over the spaced cross chains; a cross chain which will lie closely or substantially flat against the tread of the tire and which will reduce to almost a negligible factor the vibration and elevating of the tire and vehicle incident to the rolling of the wheel and the use of a plurality of spaced apart cross chains of the improved type.

Another object of this invention is to provide a cross chain which, as compared with the usual type, produces increased traction between the tire and the roadway; is less expensive to manufacture as it is of simple construction and requires less material; is light in weight and still is strong and durable; is of increased efficiency and has small surface contact with the roadway to more readily penetrate the hardest ice and effect increased traction and which cannot easily become entangled with other parts of a tire chain when removed from the tire.

A further object of the invention is to provide a cross chain with a transverse flat link, the sides of which may lie flat across the tread of a tire, and with a relatively flat bar secured across the link with the middle portion of the bar offset inwardly between the sides of the link to rest flat on the tread of the tire and provide a broad support for the structure and leave the ends of the bar raised and spaced apart to grip the roadway.

A further feature of the present invention is to provide a link with one or more bars welded to it at practically right angles across the link; and to provide a long link with its sides in parallel relation to each other to reduce the number of links required in the cross chain and without reducing the efficiency of the device.

With the foregoing and other objects in view, the invention will be more fully described hereinafter and will be more particularly pointed out in the claim appended hereto.

In the drawings, wherein like symbols refer to like or corresponding parts throughout the several views, Figure 1 is a transverse section through a rim with a tire thereon, and with an antiskid chain on the tire, the view showing a cross chain constructed according to the present invention.

Figure 2 is an enlarged transverse section taken through a cross chain on the line 2—2 of Figure 3.

Figure 3 is a top plan view of the cross chain.

Figure 4 is an enlarged end elevation of the tread link of the cross chain.

Figure 5 is a detail enlarged perspective view of one of the cross bars used.

Figure 6 is a view similar to Figure 1 but showing a slight modification in the tread portion of the cross chain.

Figure 7 is a detail enlarged top plan view of the modified tread portion.

Figure 8 is a transverse section taken through the same, showing a modified form of cross bar, and Figure 9 is an enlarged perspective view of the modified form of the cross bar.

Referring now to the drawings and first to Figures 1 to 5, 15 designates a rim which may be of any suitable type and upon which is mounted a tire casing 16, the latter having the usual relatively flat tread 17. In Figure 1, the tire casing 16 is provided with an antiskid chain having the side links 18 to which the opposite ends 19 of a cross chain are attached.

According to the present invention, the intermediate portion of the cross chain comprises an elongated link adapted to extend across the tread 17 of the tire. This elongated tread link is provided with substantially parallel sides 20, and the ends 21 of the link are suitably twisted for interlocking engagement with the adjacent links or end portions 19 of the cross chain, as clearly shown in Figures 1 and 3.

At spaced points upon the tread link are disposed cross bars 22. Each cross bar 22 comprises a blank which is substantially oblong or rectangular in form and which is cut, stamped or otherwise suitably constructed with inner corner recesses 23 of suitable size to receive the sides 20 of the tread link therein, as shown in Figures 2 and 4, and the cross bar 22 is adapted to be welded or otherwise suitably secured to the sides 20 of the long link. These cross bars are thus disposed in substantially rectangular relation across the tread link.

The recesses 23 are of such depth that the inner edge 24 of the bar 22 is disposed substantially in the plane of the inner face or side of the link, so that the edge 24 of the bar may seat against the tread 17 of the tire. It will be noted from Figure 2 particularly that this construction of bar 22 provides an inwardly offset or depressed portion to the bar which lies between the sides 20 of the tread link so that the structure is interbraced and the bar 22 is held firmly against any edgewise tendency to displace the bar from the link. The outer edge of the bar 22 is cut, stamped, or otherwise suitably formed with a recess 25 intermediate the opposite ends thereof and also opposite the depressed intermediate portion of the bar so as to leave the end portions of the bar in the form of outstanding studs 26 which are disposed substantially over or outwardly of the sides 20 of the tread link. Thus, by the peculiar stamping or formation of the bar 22 and the mounting of the same in the tread link, the bar interbraces the sides of the link, the bar and the link both seat substantially flatwise against the tread 17 of the tire to prevent injury thereto and afford a firm support for the link and bar and the construction of the bar provides the outstanding spaced apart studs 26 suitably supported and located to offset tilting or twisting of the tread link and for gripping contact with the road surfaces.

A very important feature of this construction is that the studs 26 project but relatively slightly beyond the tread 17 of the tire so that the latter is not elevated to any appreciable extent above the roadway when a plurality of the cross chains are used and during the rolling of the wheel.

With reference now to Figures 6 and 7, where the tire 16 is of relatively large size, the single tread link of Figure 1 may be substituted by two or more tread links which are relatively long and which have the same parallel sides 20, as shown in Figure 1, and upon which the bars 22 are mounted in the same manner as above set forth. In this instance, the end portions 21 of the tread links of Figures 6 and 7 are twisted, as shown in Figure 3, but at their inner or meeting ends are merely interlocked with each other in such manner as to admit of the sides 20 to lie flat against the tread 17 of the tire. Thus, it is essential to have the tread links, whether used singly or in multiple, relatively long and relatively few in number so as to lie substantially flat against the tread of the tire and support the desired number of cross bars 22 in such position that they may rest practically independently against the tread 17 of the tire. This permits the tread portion of the cross chain to extend but a slight distance beyond the tread of the tire, so that the latter will not be raised to any appreciable extent during the rolling of the wheel.

The same characteristics of the cross bar 22 may be embodied in a slight modification thereof, such as shown in Figures 8 and 9. In this modification, the cross bar 27 is of substantially the same size as the cross bar of Figures 4 and 5 but is provided at its opposite inner corners with rounded recesses 28 adapted to fit snugly against the rounded sides 20 of the tread link. Of course, the cross bar 27 is welded or otherwise suitably and permanently attached to the tread link. The inner edge 29 of the cross bar approaches or substantially lies within the inner plane of the tread link, so that it will engage the tread portion of the tire, particularly when the cross bar 17 is subjected to pressure by taking up the weight imposed on the tire. The effect is the same as shown in Figures 1 to 5 as the cross bar 27 is supported directly from the tread of the tire and the sides 20 of the tread link press into the tread of the tire sufficiently to anchor the cross chain against circumferential displacement.

The outer edge of the cross bar 27 is provided with a number of recesses 30 which may be disposed at the intermediate and end portions of the bar and may be of any desired depth so as to provide outstanding studs 31 for contact with the roadway. By providing relatively deep central recesses 30, the weight of the cross chain may be materially decreased, and accumulations of ice, mud and the like may be more readily removed or released from the cross chain as the latter is jarred or vibrated during use.

It is obvious that various changes and modifications may be made in the details of construction and design of the above specifically described embodiment of this invention without departing from the spirit thereof, such changes and modifications being restricted only by the scope of the following claim.

What is claimed is:

An anti-skid device for the links of cross chains, such links having side members round in cross section, said device comprising a pair of cubical blocks spaced apart and situated directly over the round members of the cross links and extending beyond the outer side edges of said members, said cubical blocks having tread surfaces bounded by four straight lines forming sharp edges with the adjoining side faces of the cubes, the tread surface of each cube bounded by said sharp edges being entirely flat throughout, and a third non-cubical block offset from the two spaced apart cubical blocks and being of a length to extend across the gap between the two cubical blocks and to overlap said cubical blocks by approximately one-half the widths of said cubical blocks and lying against a portion of the under faces of said blocks and being integrally united therewith, the ends of said third block forming right angle shoulders with the lower free faces of the cubical blocks being adapted to partially rest upon the round members of the chain links and to extend outwardly therebeyond, the third block lying wholly between the side members of the link and the straight ends of said third block engaging the inner rounded walls of the side members of the link.

In testimony whereof I affix my signature.

GEORGE E. THIMMES.